(12) United States Patent
Svetlik (10) Patent No.: US 9,951,896 B2
(45) Date of Patent: Apr. 24, 2018

(54) PIPE COUPLERS AND METHODS

(71) Applicant: Georg Fischer Central Plastics LLC, Shawnee, OK (US)

(72) Inventor: Harvey E. Svetlik, Grand Prairie, TX (US)

(73) Assignee: Georg Fischer Central Plastics LLC, Shawnee, OK (US)

( * ) Notice: Subject to any disclaimer, the term of this patent is extended or adjusted under 35 U.S.C. 154(b) by 241 days.

(21) Appl. No.: 14/594,614

(22) Filed: Jan. 12, 2015

(65) Prior Publication Data

US 2015/0204473 A1 Jul. 23, 2015

Related U.S. Application Data

(60) Provisional application No. 61/928,889, filed on Jan. 17, 2014.

(51) Int. Cl.
| | | |
|---|---|---|
| *F16L 23/22* | (2006.01) | |
| *F16L 17/067* | (2006.01) | |
| *F16L 23/08* | (2006.01) | |

(52) U.S. Cl.
CPC ............. *F16L 17/067* (2013.01); *F16L 23/08* (2013.01); *F16L 23/22* (2013.01)

(58) Field of Classification Search
CPC . F16L 23/04; F16L 23/08; F16L 23/16; F16L 23/162; F16L 23/18; F16L 23/22; F16L 17/067; F16L 17/073; F16L 47/14
USPC ................. 285/367, 368, 364, 365
See application file for complete search history.

(56) References Cited

U.S. PATENT DOCUMENTS

| | | | | |
|---|---|---|---|---|
| 3,498,649 A | * | 3/1970 | Pfeuffer ................. | F16L 23/04 |
| | | | | 285/336 |
| 3,669,474 A | * | 6/1972 | Bode ....................... | F16L 23/14 |
| | | | | 285/336 |
| 3,822,075 A | * | 7/1974 | Duncan ................... | F16L 23/04 |
| | | | | 285/367 |

(Continued)

FOREIGN PATENT DOCUMENTS

| | | | | |
|---|---|---|---|---|
| DE | 3839604 A1 | | 5/1990 | |
| DE | 10007369 A1 | * | 8/2001 | ............. F16L 21/06 |

(Continued)

OTHER PUBLICATIONS

Handbook of PE Pipe, Chapter 9, PE Pipe Joining Procedures, 2nd ed., 2010, pp. 327-357, Plastics Pipe Institute, Irving, Texas.

(Continued)

*Primary Examiner* — David Bochna
*Assistant Examiner* — James A Linford
(74) *Attorney, Agent, or Firm* — Bachman & LaPointe, P.C.

(57) ABSTRACT

A pipe coupler for coupling a first pipe to a second pipe comprises: a body; a first flange and a second flange; and a gasket. The body, first flange, second flange, and gasket are dimensioned to have an assembled condition. The gasket, first flange, and second flange are coaxial. The gasket is axially sandwiched between an inboard face of the first flange and an inboard face of the second flange. The body encircles the gasket, first flange, and second flange and has a first portion axially outboard of the first flange and a second portion axially outboard of the second flange.

20 Claims, 7 Drawing Sheets

(56) References Cited

U.S. PATENT DOCUMENTS

| | | | |
|---|---|---|---|
| 4,185,858 A * | 1/1980 | Peash | F16L 23/18 |
| | | | 277/616 |
| 5,106,128 A | 4/1992 | Dugast et al. | |
| 6,302,450 B1 | 10/2001 | Dole et al. | |
| 6,302,452 B1 | 10/2001 | Schlicht | |
| 7,210,201 B2 | 5/2007 | Maeckle et al. | |
| 7,883,121 B2 | 2/2011 | Henry | |
| 2003/0141719 A1 | 7/2003 | Ranson, Jr. et al. | |

FOREIGN PATENT DOCUMENTS

| | | | |
|---|---|---|---|
| DE | 102009020942 A1 | 11/2010 | |
| DE | 202009018707 U1 | 11/2012 | |
| GB | 866626 A * | 4/1961 | F16L 23/04 |
| GB | 1045690 A * | 10/1966 | F16L 23/04 |

OTHER PUBLICATIONS

Bolt Torque for Polyethylene Flanged Joints TN-38/Jul. 2011, Plastics Pipe Institute, Irving, Texas.
Anatomy of a Grooved Pipe Joint, 2010, VICTAULIC Company, Easton, Pennsylvania.
Seal Selection Guide, 2013, VICTAULIC Company, Easton, Pennsylvania.
Composite Flexible Coupling, 2013, VICTAULIC Company, Easton, Pennsylvania.
AC-9 Grooved Coupling, 2012, pp. 3-5, Star Pipe Products, Houston, Texas.

* cited by examiner

PIPE COUPLERS AND METHODS

CROSS-REFERENCE TO RELATED APPLICATION

Benefit is claimed of U.S. Patent Application Ser. No. 61/928,889, filed Jan. 17, 2014, and entitled "Pipe Couplers and Methods", the disclosure of which is incorporated by reference herein in its entirety as if set forth at length.

BACKGROUND

The invention relates to plastic pipe joining. More particularly, the invention relates to plastic pipe joining by mechanical clamps or couplers.

A well developed field exists in polymeric piping systems. Perhaps the most well known thermoplastic material for pipes and pipe fittings is polyvinyl chloride (PVC). PVC pipes and fittings are typically joined to each other via the use of a solvent cement to form joints characterized by solvent weld/bonds. Other solvent-weldable materials include chlorinated polyvinyl chloride (CPVC) and acrylonitrile butadiene styrene (ABS).

It may be less practical to solvent weld other thermoplastics such as polyethylene (PE, including high density polyethylene (HDPE) medium density polyethylene (MDPE), and low density polyethylene (LDPE)), polypropylene (PP), polystyrene (PS), polyamide (PA) and polybutylene (PB). Joining plastic pipe fittings by thermal welding (e.g., provided via butt-fusion or electrofusion) is an alternative to solvent welding.

In addition to such permanent joints, a number of other joints and configurations have been proposed. One family of joints involves bolted flanges wherein respective flanges are mounted at adjacent ends of adjacent pipe segments and secured to such pipe segments. Each flange has a hole circle for receiving a bolt circle coupling the two flanges together. A gasket may be sandwiched between the flanges for sealing.

Another family of mechanical joints involves a radial clamping/compression. A clamp body may surround adjacent end portions of the pipe segments and are sealed radially between the pipe and the clamp body.

Other coupling arrangements include bell-and-spigot arrangements. For example, in some such couplings, a bell body is mounted over and secured to the end portion of one pipe and, in turn, receives the adjacent portion of the other pipe with a radial gasket therebetween.

The various joint techniques suffer a number of problems. First, some are difficult. For example, it may take much effort to tighten down a bolt circle. Also, a bell-and-spigot joint may suffer from reliability issues. For example, failure to properly seat the gasket (e.g., the gasket becomes rolled during insertion) may produce leaks.

Additionally, such joints suffer from an inability to accommodate axial pipe contraction under pressure. The internal pressurization of a plastic pipe will cause both a radial expansion and an axial contraction. If the pipe is rigidly mounted (e.g., a bolted flange joint), this contraction will be only partial and place the pipe joint under tension, potentially damaging the joint or pipe or causing loss of sealing. Thus a rigid flange joint may be subject to leakage and breakage and a bell-and-spigot joint may be subject to disengagement/separation of the spigot from the bell.

SUMMARY

One aspect of the disclosure involves a pipe coupler for coupling a first pipe to a second pipe. The coupler comprises: a body; a first flange and a second flange; and a gasket. The body, first flange, second flange, and gasket are dimensioned to have an assembled condition. The gasket, first flange, and second flange are coaxial. The gasket is axially sandwiched between an inboard face of the first flange and an inboard face of the second flange. The body encircles the gasket, first flange, and second flange and has a first portion axially outboard of the first flange and a second portion axially outboard of the second flange.

In one or more embodiments of any of the foregoing embodiments, the body has a plurality of segments securable end-to-end.

In one or more embodiments of any of the foregoing embodiments, the body segments are circumferentially bolted end-to-end.

In one or more embodiments of any of the foregoing embodiments, the inboard face of the first flange and the inboard face of the second flange diverge from each other radially inwardly.

In one or more embodiments of any of the foregoing embodiments, the inboard face of the first flange and the inboard face of the second flange have conic half angles ($\theta_1$) of 65° to 85°.

In one or more embodiments of any of the foregoing embodiments, the first flange and the second flange are respective portions of a first adapter and a second adapter, each having: a main body extending from a first rim to a second rim and having an inboard surface and an outboard surface; and the associated flange protruding from the outboard surface and axially recessed from the first rim and second rim.

In one or more embodiments of any of the foregoing embodiments, the first adapter and the second adapter are plastic.

In one or more embodiments of any of the foregoing embodiments, the gasket is elastomeric and has a radially inwardly-open C-shaped cross-section.

In one or more embodiments of any of the foregoing embodiments, the first flange and the second flange have outer diameters ($OD_2$) greater than characteristic outer diameters ($OD_1$) of the first pipe and the second pipe.

Another aspect of the disclosure involves a pipe joint comprising: the pipe coupler in its assembled condition; a first pipe secured to the first flange; and a second pipe secured to the second flange.

In one or more embodiments of any of the foregoing embodiments, the first pipe and the second pipe are plastic.

In one or more embodiments of any of the foregoing embodiments, a method for using the pipe coupler comprises: applying the gasket to a first piping element bearing the first flange; mating to the gasket a second piping element bearing a second flange; and applying the body.

In one or more embodiments of any of the foregoing embodiments, the applying the body comprises securing body segments end-to-end.

In one or more embodiments of any of the foregoing embodiments, the method further comprises pressurizing the piping system so as to drive the gasket radially outward to increase its engagement with the first flange and the second flange.

In one or more embodiments of any of the foregoing embodiments, the method further comprises securing the first piping element to a first pipe; and securing the second piping element to a second pipe.

In one or more embodiments of any of the foregoing embodiments, the securing of the first piping element to the first pipe is via butt fusion welding; and the securing of the second piping element to the second pipe is via butt fusion welding.

Another aspect of the disclosure involves a pipe joint comprising: a first pipe element having a first end; a first flange on first pipe element; a second pipe element having a first end; a second flange on the second pipe element; and a clamp. The clamp has: an outer band, a first flange extending radially inward from the outer band, and a second flange extending radially inward from the outer band, the first flange and the second flange sandwiched between the first flange and the second flange of the clamp; and a gasket. The gasket is in sealing engagement with the first flange and the second flange and is radially supported by the band.

In one or more embodiments of any of the foregoing embodiments, the pipe joint has a nominal diameter of 1 inch to 24 inch.

In one or more embodiments of any of the foregoing embodiments, the first flange and second flange protrude radially beyond the gasket; and the clamp outer band has a radially-inwardly protruding portion engaging the gasket between the first flange and the second flange.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
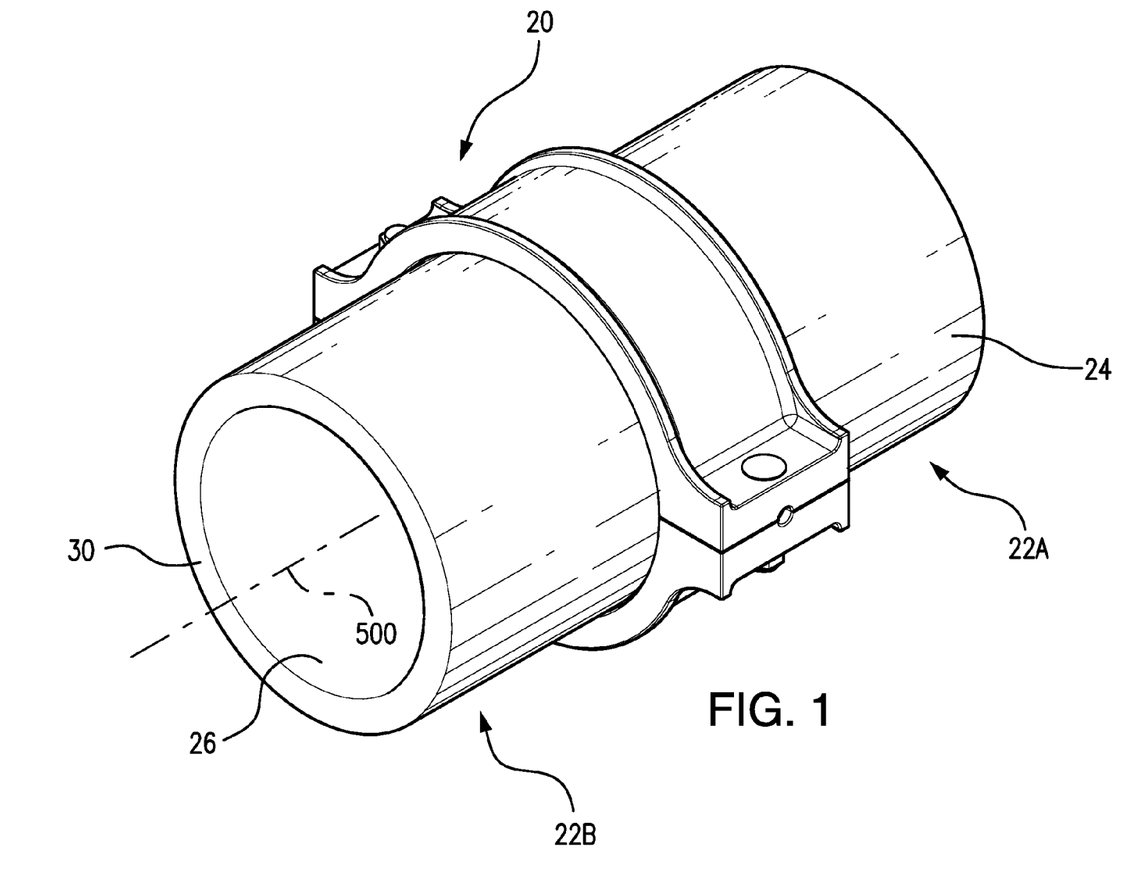
FIG. 1 is a view of a pipe coupler forming a pipe joint in a piping system.

FIG. 1 shows a joint 20 between two coaxial piping elements 22A, 22B (collectively or individually 22). In the exemplary joint, both piping elements are adapters which are, in turn, secured to respective pipes and/or fittings. In alternative implementations, the piping elements may themselves be pipes or fittings. The exemplary pipe is plastic pipe and the associated elements 22A, 22B and any fitting bodies may be plastic. Each piping element has a central longitudinal axis (centerline) 500, an outer or outer diameter (OD) surface 24, and an inner or inner diameter (ID) surface 26. Each element 22 extends between a first (proximal) end 28 (FIG. 2) at the joint and a second (distal) end 30 away therefrom. Exemplary ends are formed as flat annular radially-extending rims.

Exemplary plastic pipe and fitting materials are selected from the group consisting of polyvinylchloride (PVC), chlorinated polyvinylchloride (CPVC), acrylonitrile butadiene styrene (ABS), polyethylene (PE, including high density polyethylene (HDPE), medium density polyethylene (MDPE), low density polyethylene (LDPE), and linear low density polyethylene (LLDPE)), polypropylene (PP), polystyrene (PS), polybutylene (PB), polyamide (PA), and polyvinyl difluoride (PVDF).

Figure 4:
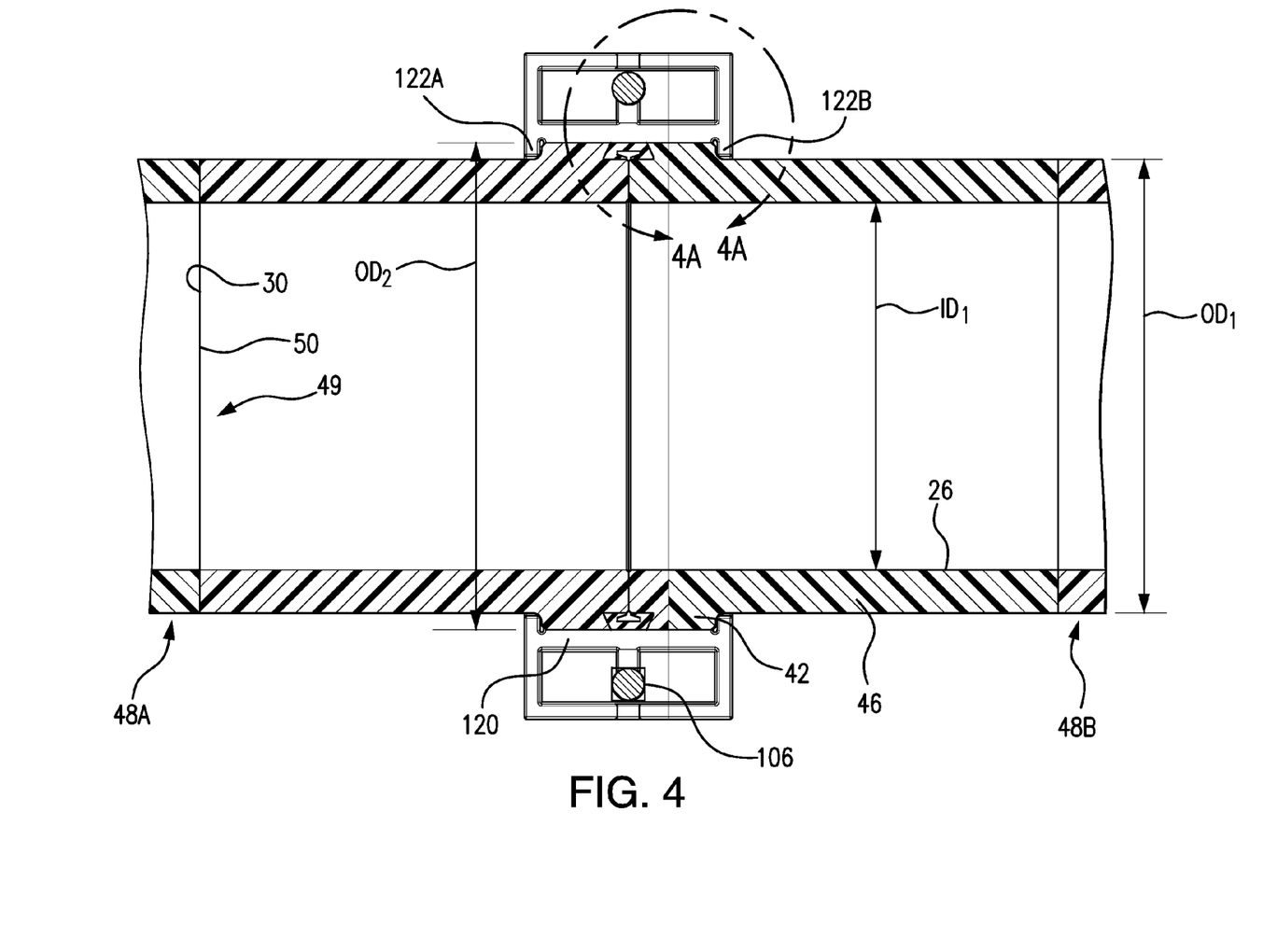
FIG. 4 is a central longitudinal sectional view of the coupler, taken along line 4-4 in FIG. 3.

The joint is formed by a clamp 40 engaging flanges 42 on the respective piping elements. A gasket 44 provides sealing. FIG. 4 shows the exemplary flanges 42 as unitarily formed with main body portions 46 of the respective elements 22. One way of unitarily forming the flange with the main body is via molding. Another way is via machining from larger outer diameter (OD)/thicker wall pipe stock. For example, the exemplary surface 26 has an inner diameter $ID_1$ and the exemplary outer surface 24 has, away from the flange 42, an outer $OD_1$. $ID_1$ and $OD_1$ may correspond to the inner and outer diameters of the pipe stock to which the adapters are to be mated (exemplary pipe stock being 1 inch to 24 inch). Along the flange 42, an outer diameter (discussed below) may have a dimension $OD_2$ which is larger than $OD_1$. Accordingly, the element 22 may be machined from relative thick-walled pipe having an outer diameter at least $OD_2$ for mating with relatively thin-walled pipe having an outer diameter equal to $OD_1$. As is discussed further below, the elements 22 may be secured to adjacent lengths or segments 48A, 48B of pipe prior to clamping. For example, at the rims 30, elements 22 may be butt fusion welded 49 or otherwise secured to ends 50 of associated pipe segments. In such a system, the elements 22, clamp 40, and gasket 44 combine to form a coupling system or coupler for joining such pipe segments 48A, 48B.

In alternative implementations, the flanges 42 may be separately formed and then secured to pipes. For example, the flanges may be secured to the associated pipes via thermal and/or chemical bonding. Exemplary flange materials are plastics (e.g., of like composition to the pipe) or metal (e.g., machined aluminum). In one example, the flanges are molded (injection molded) with an outer diameter essentially $OD_1$ and are slid over and mounted to the pipes by a solvent bonding or thermal fusion.

In cross-section, each exemplary flange 42 (FIG. 4A) comprises an outer (radially outer) or outer diameter (OD) surface 52 facing generally radially outward. Each flange also has a generally radially extending proximal (axially inboard relative to the center of the joint) face 54 near the associated end 28 and an axially opposite distal (axially outboard) face 56. As is discussed further below, the face 54 or a majority radial span portion thereof is slightly off-radial (e.g., frustoconical with a cone half angle shown as $\theta_1$). Exemplary $\theta_1$ is 60° to 89°, more particularly, 65° to 85° or about 70° to 80°. Selection of $\theta_1$ may be influenced by gasket availability. For example, in a smaller size range (e.g., 3 inch to 6 inch) the most available gaskets facilitate an angle in the vicinity of 78° to 80°. In larger sizes (e.g., 8 inch to 12 inch) the most available gaskets suggest a smaller angle in the vicinity of 70°.

Figure 4A:
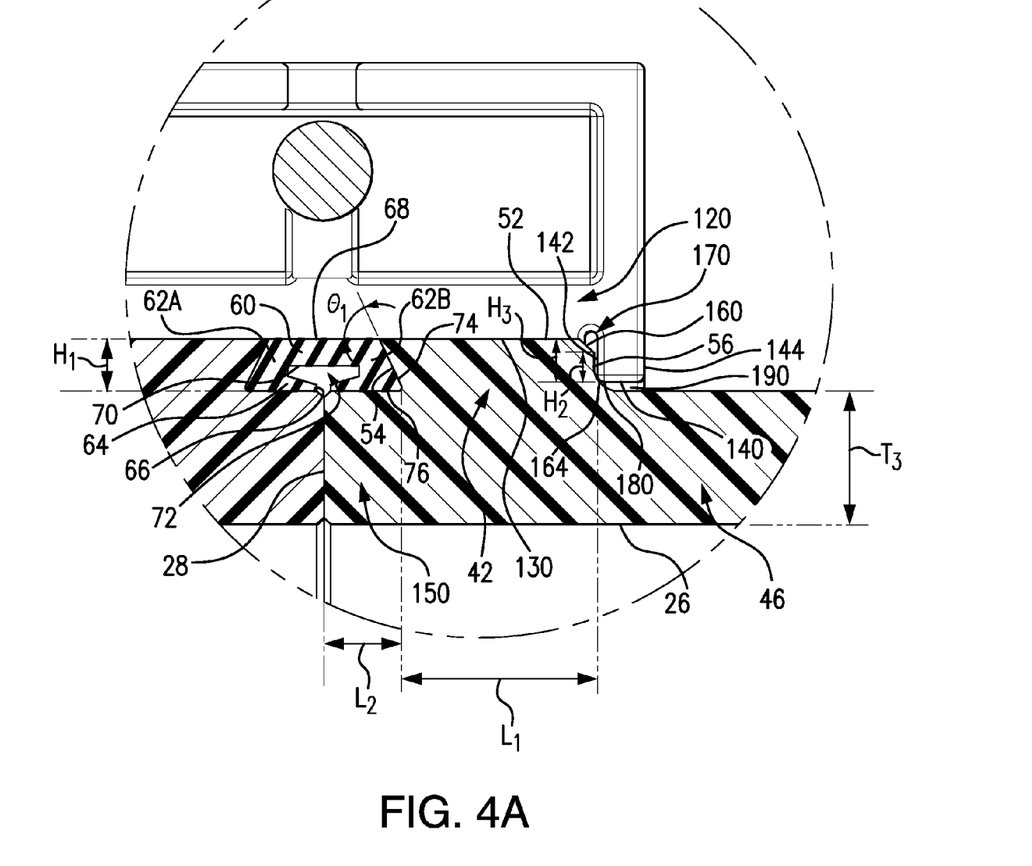
FIG. 4A is an enlarged view of a gasket region of the coupler of FIG. 4.

The exemplary gasket 44 is a conventional C-sectioned elastomeric (e.g., rubber) gasket with the cross-section opening radially inward. The gasket has an outer band portion 60 and radially-inwardly extending legs 62A and 62B at opposite axial ends of the band 60. At radially inboard ends, the legs 62 have axially inwardly directed sealing lips 64 extending axially inward to rims 66. The band portion has an outer diameter (OD) surface 68 and inner diameter (ID) surface 70. A cavity 72 of the C-section is formed between the surface 70 and facing surfaces of the lips 64. The legs 62 each have an outward facing surface 74 for sealing with the associated flange face 54, as is discussed further below. The lips each have inboard surfaces 76 for sealing with the OD of the associated element 22 adjacent the flange face 54.

The exemplary clamp 40 comprises a multi-piece body 90 (FIG. 2) having an assembled condition encircling the gasket 44 and flanges 42. The clamp is sufficiently robust to withstand pressure-induced radial loads from the gasket and axial loads from the flanges associated with pressure thrust from the pipe ID bore area and Poisson's ratio longitudinal contraction of the pipes when internally pressurized.

Figure 2:
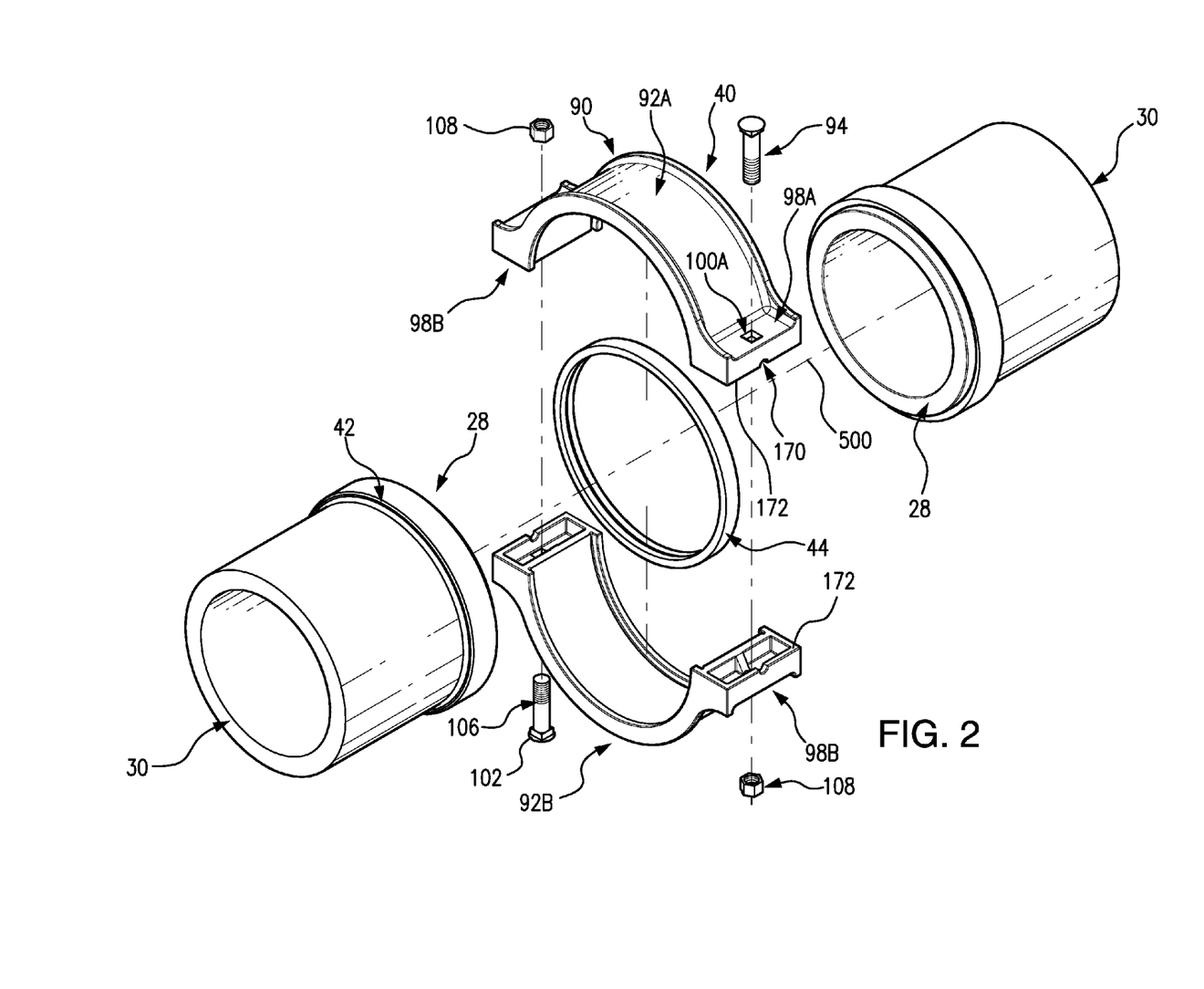
FIG. 2 is an exploded view of the coupler of FIG. 1.

The exemplary clamp body 90 comprises multiple segments which may be secured to each other in the assembled condition. The exemplary body 90 comprises two segments 92A, 92B (collectively 92). The exemplary segments are identical and secured to each other via fasteners 94. Exemplary fasteners are screws or bolts along with associated nuts, washers, and the like as are discussed below. Alternative configurations may have other attachments between one or more pairs of adjacent segments. For example, a pinned joint might be used between two segments forming a clamshell or between all segments in a group except for the terminal ends (e.g., in a group of three 120° segments, the central segment could be pinned at both ends to its adjacent segments and the terminal ends of the other two segments could have a bolt or similar fastener connecting them).

Figure 5:
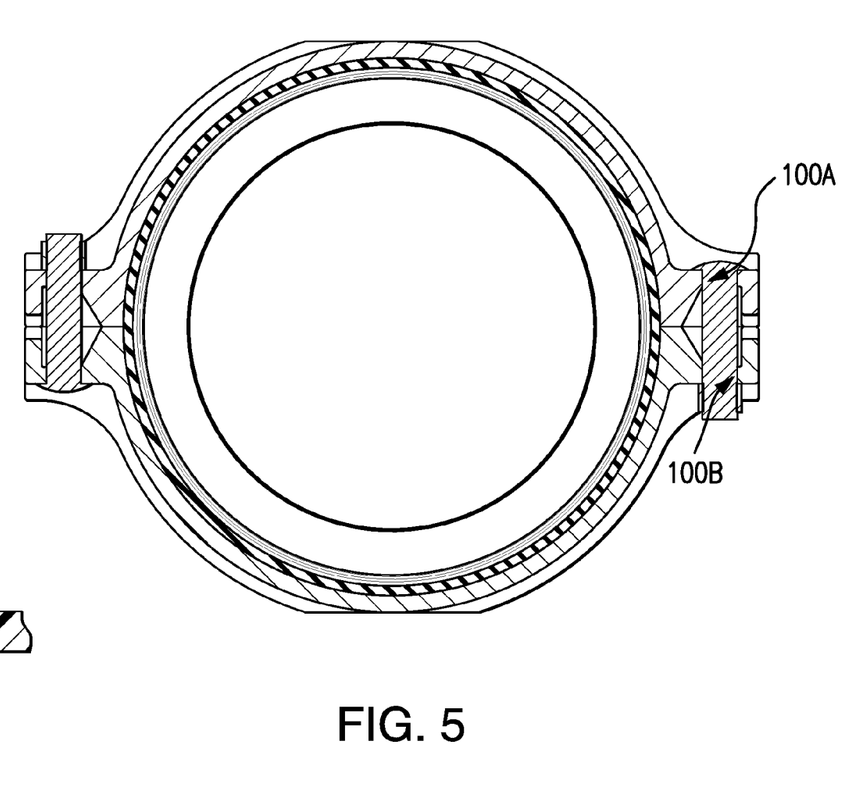
FIG. 5 is a central transverse sectional view of the coupler taken along line 5-5 of FIG. 3.

To engage the fasteners 94, at opposite circumferential ends, each segment includes a mounting lug, ear, or longitudinal flange 98A, 98B having an aperture 100A, 100B (FIG. 5) for passing the fastener. Exemplary apertures 100A are square-sectioned to interlock with facets of a square under-head boss 102 (FIG. 2) of a carriage bolt 106 as the fastener bolt. The shank of the bolt passes through the round hole 100B of the adjacent ear or flange of the adjacent segment and receives a nut 108 and washer(s). Alternative configurations for further robustness may involve multiple fasteners at each adjacent segment end pair. Yet other configurations may have a greater number of segments or other fastener arrangements such as a hinge at one segment junction.

Figure 3:
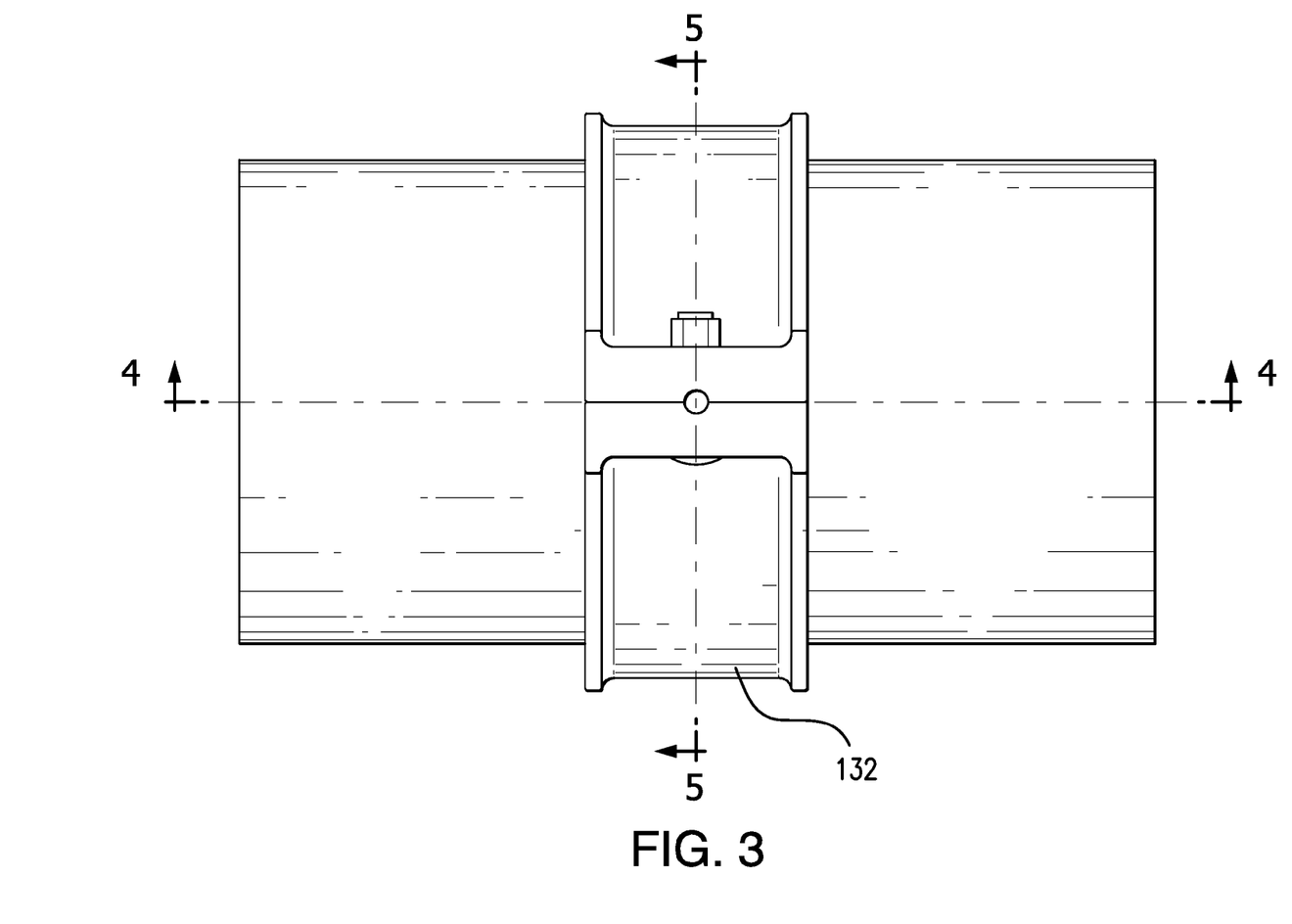
FIG. 3 is a side view of the coupler of FIG. 1

For cooperating with the gasket 44 and flanges 42, the clamp body 90 comprises an outer band 120 (FIG. 4) and a pair of radially-inwardly protruding flanges 122A, 122B (collectively 122) at opposite axial ends of the band. The band has an inner or inner diameter (ID) surface 130 (FIG. 4A) and an outer or outer diameter (OD) surface 132 (FIG. 3). The flanges 122 have an inner or inner diameter (ID) rim 140 and an inboard or inner (axially) surface 142 and an outboard or outer (axially) surface 144.

Figure 6:
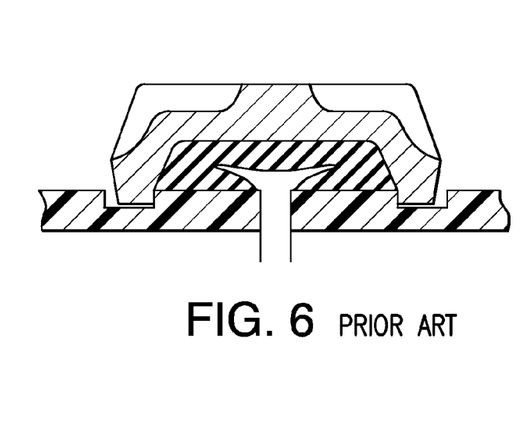
FIG. 6 is a partial central longitudinal sectional view of a prior art coupler for metal pipe.

In an exemplary sequence of manufacture, the clamp body segments are molded (e.g., if of polymer) or cast (e.g., if of metal) and may be subject to machining. The gasket 44 may be molded. An exemplary gasket is an elastomeric gasket having a radially inwardly-open C-section or E-section. Such gaskets are well known for use in joining metal pipes wherein each of the ID surfaces 76 seal against the OD surface of an associated flange and the OD surface 68 is held in compression via a clamp. FIG. 6 shows one such prior art use on metal pipes wherein each pipe has, adjacent its mating end, a cut or rolled groove for receiving the associated flange of a clamp to axially retain the pipes. The intact portion of the pipe within the clamp thus forms a flange whose OD surface is engaged by the gasket surfaces 76. The gasket surfaces 74 and 68 are compressed by adjacent surfaces of the clamp.

The elements 22 may be molded (e.g., if of polymer) or machined (e.g., if of aluminum). A molded flange may be machined after molding for precision.

Each element 22 main body 46 has an end portion 150 protruding beyond the flange. The gasket 44 may be installed partially over one of the protruding end portions 150 and then the other end portion 150 may be inserted into the gasket. The installation over one end portion 150 and then the insertion of the other end portion 150 may involve a very slight radial stretching of the gasket or other deformation (e.g., radially outward flexing of the lips 64 from their relaxed condition). This slight deformation provides a residual low pressure seal. Further sealing may be provided by a self-energizing effect in response to pressurization discussed below.

In an exemplary installation situation, the initial position of the flanges 42 is such that the initial separation between the distal faces 56 of the two flanges is smaller than the separation between the inner faces 142 of the clamp body flanges. This allows the clamp body to be easily and loosely assembled over the flanges 42 and gasket 44. Initial tightening of the clamp is in a condition wherein the distal faces 56 may have a slight taper inward from the pipe OD toward the flange OD so as to allow ease of engagement and disengagement by the clamp body. For example, as is discussed further below, the distal faces 56 may each have an OD chamfer 160 transitioning to the associated surfaces 52. The chamfer 160 and any slight taper below that (e.g., up to about 10°) may allow ease of installation and self-guiding of the clamp body flanges particularly when there is an initial slight misalignment between the two members being joined. The inclination is not intended to impose unloaded/unpressurized axial compression on the end 28, but rather to provide a snug assembly of the two elements 22 and gasket inside the clamp, such that when the joint is pressurized it self-seals and becomes rigidized from the internal pressure and clamp geometry.

FIG. 4A also shows a radiused transition 180 of the surface 56 transitioning into the constant outer diameter portion of the element 22 away from the flange 42. This transition has an exemplary radius of curvature of at least approximately one quarter of the pipe wall thickness $T_1$. The adjacent corner 164 of the cross-section of the clamp flange transitioning to the ID rim 140 is also radiused to avoid stress concentrations. Thus, initial assembly may involve abutting the ends 28 and applying and tightening the clamp to create a snug fit with local interference at annular contact zones associated with the cross-section corners 164.

FIG. 4A also shows a slight radial gap 190 between the outer diameter at $OD_1$ and the rim 140. This gap is effective to accommodate radial expansion of the pipe under pressurization while the clamp longitudinal flanges 98 are held abutting by the associate bolt when under bolt-load.

The piping system is then pressurized in use. Pressurization will tend to radially expand the pipe (inclusive of the elements 22) and axially contract it in accordance with the pipe's Poisson's ratio. Many pipes are held against this contraction (e.g., including buried pipe). This imposes a longitudinal tensile stress on the pipe which will tend to cause the ends 28 to pull away from each other within the clamp (to create a gap (not shown) between the ends 28) bringing the faces 56 of the flanges into firmer engagement with the adjacent inner faces 142 of the clamp flanges. Even as the flanges 42 shift away from each other within the clamp, a seal is maintained by pressure within the joint acting on the gasket. For example, as the rims 28 pull apart from each other, the cavity 72 will be subject to the internal pressure of the piping system. This will bias the band 60 radially into firmer engagement with the clamp band. However, it will also bias the legs 62 radially and axially outward so as to create firmer engagement between their surfaces 74 and the associated face 54 of the flange 42. This engagement is facilitated by having the taper associated with the angle $\theta_1$ mentioned above which creates a radial wedging action increasing the sealing strength. This sealing design thus provides a pressure-energized seal.

The final tightening of the clamp and subsequent pressurization increase the engagement loads between the clamp body and the flange causing local deformation of the flange at the cross-section corner 164 and radially spreading the axial engagement force distribution along the face 56. Accordingly, the engagement heights $H_2$ from the ID clamp flange rim 140 to the beginning of the chamfer 160 and $H_3$ to the surface 52 are sufficient to provide necessary cross-sectional area of material to avoid axial failure by a material flow under lobe. An additional benefit of the chamfer 160 is that it avoids possible problems associated with rolling a sharp edge over onto the surface 56. For example, initial misalignment during assembly might locally roll a portion of the edge onto 56, thereby making assembly more difficult or creating an uneven stress distribution.

FIG. 4A also shows a radiused undercut 170 (e.g., as a radially inwardly-open semicircular or other arcuate channel between the face 142 and the surface 130). This stress relief channel reduces stress concentrations that would be associated with a sharp right angle transition and, thereby, reduces failure possibilities of the clamp body.

To disassemble the joint, the fasteners may be removed (e.g., unscrewed/unbolted). The exemplary embodiment provides means for facilitating prying apart of the flanges 98A and 98B. In the illustrated example, these are provided by a half hole 170 (FIG. 2) extending radially inward through at least a portion of a mating face 172 of each of the flanges 98A, 98B. A tool (e.g., a pry bar) can be inserted to lever apart the two segments.

FIG. 4A further shows the pipe wall thickness as $T_1$. The exemplary flange 42 has an exemplary length $L_1$ (e.g., measured between a base or inward periphery of the surface 54 and a contact location with the clamp flange). The exemplary protruding portion 150 has a length $L_2$ therebeyond. The exemplary flange has a height or radial span $H_1$ beyond the pipe outer diameter $OD_1$. Exemplary $L_1$ is at least 125% of $T_1$ to avoid shearing of the flange under an anticipated range of loads (e.g., within the pipe's burst strength). The radial span $H_1$ and, more particularly, the engagement area between the face 56 and the clamp is desirably sufficient to keep axial bearing load stress intensity below the adapter material's compressive yield stress limit throughout the anticipated range of loads.

Accordingly, several benefits are seen relative to several alternative joint constructions. Labor may be substantially reduced. For example, tightening of bolts in a bolt circle on bolted flange joints is quite labor intensive. There may be many bolts to tighten and these must be tightened to specific torque standards. In addition to the mere number of bolts, tightening requires full 360° access to the joint. In the example above, however, only two fasteners must be tightened. They need not be tightened to a rigid and uniform torque specification. Also, the clamp can be put in position and/or rotated to provide access to fasteners. Even with a greater number of segments (e.g., two segments to eight segments) a greater number of fasteners at each inter-segment joint (e.g., two fasteners to four fasteners at each joint) the labor may still be reduced relative to a very large bolt circle which may have tens of bolts.

Furthermore, it is seen that an additional benefit can be the accommodation of Poisson's ratio-associated contractions. The amount of shift in each joint between the un-pressurized and pressurized conditions represents strain that the pipe doesn't otherwise have to undergo (e.g., when compared with a rigidly bolted flange joint). This may also avoid the pull-out disengagement associated with bell-and-spigot joints.

An additional benefit can be the accommodation of differential thermal expansion and/or contraction. For example, consider the prior art FIG. 6 joint of metallic pipe. The strength of metal pipe allows for a relatively small annular area of contact between the clamp and the wall of the groove. If this is applied to a plastic pipe, several problems may attend. First, the cross-sectional area of contact will have to be increased due to the lower strength of the plastic pipe and due to the effects of longitudinal contraction of the pipe under load. There may not be enough pipe material (wall thickness) to allow such a groove to be formed and, therefore, additional thickness would have to be added. Furthermore, a plastic pipe will have a greater coefficient of thermal expansion (CTE) than the clamp. If the pipe is cooled (e.g., cold weather or carrying a cold fluid) the pipe will, therefore, contract more than the clamp thereby reducing the contact area. In addition to causing mechanical failure, this may cause leakage.

Figure 7:
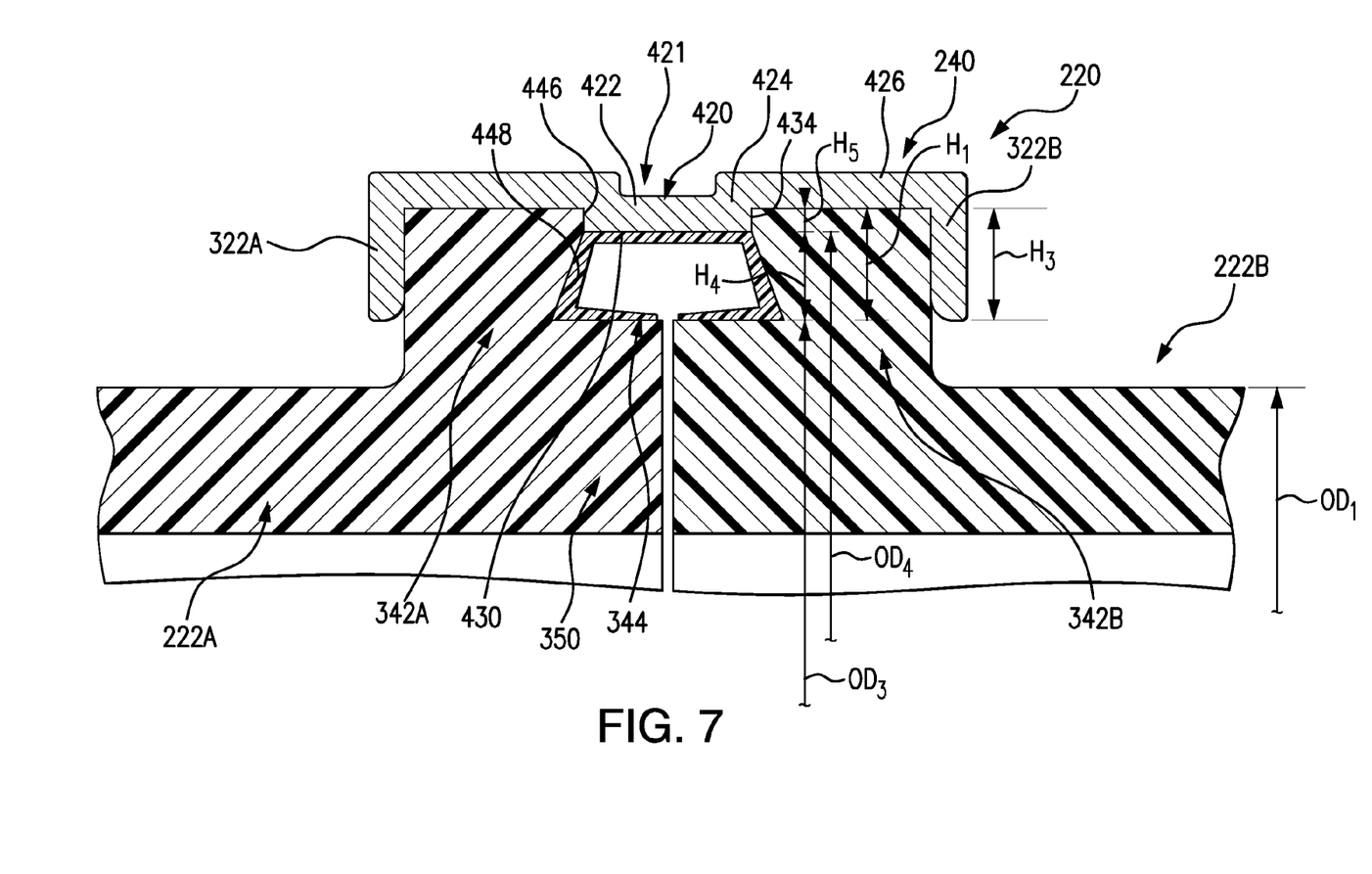
FIG. 7 is a central longitudinal sectional view of a second coupler.

FIG. 7 shows a second joint 220 which may be otherwise similar to the joint discussed above. However, certain cross-sectional differences in the geometry of the piping elements 222A and 222B (collectively or individually 222) and the clamp 240 are discussed below. With particularly large diameter pipe (e.g., outer diameters greater than 12 inches) the required radial span of engagement between the clamp flanges 322A and 322B (collectively or individually 322) and the respective piping element flanges 342A and 342B (collectively or individually 342) may become excessive relative to the desired radial span of the gasket 344. In particular, in order to provide the necessary radial span of engagement $H_3$, the flange radial span $H_1$ will have to be significantly larger than the desired gasket radial span $H_4$. This may be associated with the desire to use a conventional off-the-shelf radial gasket such as the prior art gasket mentioned above. Increasing the outer diameter $OD_3$ along the end portions 350 relative to $OD_1$ may not be an option due to the desire to not overstretch the stock gasket 344. Accordingly, the flanges 342 may protrude substantially radially beyond the outboard surface of the gasket. For example, the flanges are shown protruding by a height $H_5$ which may be at least 50% of $H_4$, more particularly, at least 100% of $H_4$ or even more. Thus, exemplary $OD_3$ may be essentially the same as $OD_1$ or within a few percent thereof.

To accommodate the extra height $H_5$, the clamp is provided with a central inwardly projecting portion 420 (e.g., formed as a channel 421 having a base 422 and sidewall portions 424 extending radially outward from opposite longitudinal ends of the base 422 to join with main sections 426 of the band portion of the clamp body). The illustrated example has a very shallow channel 421 so that the sidewall portions 422 are merely the junctions of the base 422 and main sections 426 (i.e., the outer diameter (OD) surface of the body along the base 422 is still outboard of the inner diameter (ID) surface portions of the main sections 426). However, alternative embodiments may involve deeper channels wherein the OD surface of base 422 is inboard of the ID surfaces of sections 426 so as to create separate and discrete sidewalls 424.

The portion 420 and more particularly its base 422 has an inboard/inner/inner diameter (ID) surface 430 which may closely face the OD surface of the gasket and, at least under pressure/load, bear against it. Also, the channel sidewalls 424 have surfaces 434 facing associated outboard sections 446 of the adjacent radial faces of the flanges. To engage opposite sides of the gasket as is discussed below, the radial faces may have inboard portions 448 tapered at the aforementioned angle $\theta_1$ to function similarly to the flange faces of the joint 20. At their outboard ends, the surfaces 448 transition to the surfaces 446 which may be more radial and may even be oppositely canted. Otherwise, structure and operation of the joint 220 may be similar to that of the joint 20 and the corresponding details are not repeated.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an particular pipe size or end use, details of such size or use may influence details of particular implementations. Accordingly, other embodiments are within the scope of the following claims.

What is claimed is:

1. A pipe coupler for coupling a first pipe to a second pipe, the coupler comprising:
    a body;
    a first flange and a second flange each having an axially inboard face and an axially outboard face; and
    a gasket,
wherein the body, first flange, second flange and gasket are dimensioned to have an assembled condition wherein:
    the gasket, first flange, and second flange are coaxial;
    the gasket is elastomeric and has a radially inwardly-open C-shaped cross-section;
    the axially inboard face of the first flange and the axially inboard face of the second flange diverge from each other radially inwardly;
    the gasket is axially sandwiched between said axially inboard face of the first flange and said axially inboard face of the second flange; and
    the body encircles the gasket, first flange, and second flange and engages the gasket between the first flange and the second flange and has a first portion axially outboard of the first flange and a second portion axially outboard of the second flange, the first portion and the second portion each having an inner face respectively positioned to engage the axially outboard face of the first flange and the axially outboard face of the second flange.

2. The pipe coupler of claim 1 wherein:
the body has a plurality of segments securable end-to-end.

3. The pipe coupler of claim 2 wherein:
the body segments are circumferentially bolted end-to-end.

4. The pipe coupler of claim 1 wherein:
the axially inboard face of the first flange and the axially inboard face of the second flange have conic half angles ($\theta_1$) of 65° to 85°.

5. The pipe coupler of claim 1 wherein:
the first flange and the second flange are respective portions of a first adapter and a second adapter, each having:
    a main body extending from a first rim to a second rim and having an inboard surface and an outboard surface; and
    the associated flange protruding from the outboard surface and axially recessed from the first rim and second rim.

6. The pipe coupler of claim 5 wherein:
the first adapter and the second adapter are plastic.

7. The pipe coupler of claim 1 wherein:
the first flange and the second flange have outer diameters ($OD_2$) greater than characteristic outer diameters ($OD_1$) of the first pipe and the second pipe.

8. A pipe joint comprising:
    the pipe coupler of claim 1 in its assembled condition;
    a first pipe secured to the first flange; and
    a second pipe secured to the second flange.

9. The pipe joint of claim 8 wherein:
the first pipe and the second pipe are plastic.

10. The pipe joint of claim 8 wherein:
the gasket is in sealing engagement with the first flange and the second flange and is radially supported by the body.

11. The pipe joint of claim 8, wherein:
the pipe joint has a nominal diameter of 1 inch to 24 inch.

12. The pipe joint of claim 8, wherein:
the first flange and second flange protrude radially beyond the gasket; and
the body has a radially-inwardly protruding portion engaging the gasket between the first flange and the second flange.

13. A method for using the pipe coupler of claim 1 in a piping system, the method comprising:
    applying the gasket to a first piping element bearing the first flange;
    mating to the gasket a second piping element bearing a second flange; and
    applying the body.

14. The method of claim 13 wherein the applying the body comprises securing body segments end-to-end.

15. The method of claim 14 wherein:
the securing of the first piping element to the first pipe is via butt fusion welding; and
the securing of the second piping element to the second pipe is via butt fusion welding.

16. The method of claim 13 further comprising pressurizing the piping system so as to:
drive the gasket radially outward to increase its engagement with the first flange and the second flange.

17. The method of claim 13 further comprising:
securing the first piping element to a first pipe; and
securing the second piping element to a second pipe.

18. A pipe coupler for coupling a first pipe to a second pipe, the coupler comprising:
    a body;
    a first flange and a second flange each having an axially inboard face and an axially outboard face; and
    a gasket,
wherein the body, first flange, second flange and gasket are dimensioned to have an assembled condition wherein:
    the gasket is elastomeric and has a radially inwardly-open C-shaped cross-section;
    the gasket, first flange, and second flange are coaxial;

the gasket is axially sandwiched between said axially inboard face of the first flange and said axially inboard face of the second flange; and the body encircles the gasket, first flange, and second flange and has a first portion axially outboard of the first flange and a second portion axially outboard of the second flange.

19. The pipe coupler of claim 18 wherein:

the body engages the gasket between the first flange and the second flange.

20. The pipe coupler of claim 18 wherein:

the first flange protrudes radially outward from a first outer diameter surface;

the second flange protrudes radially outward from a second outer diameter surface; and the gasket has respective surfaces sealing with the first outer diameter surface and the second outer diameter surface.

* * * * *